Figure 2:
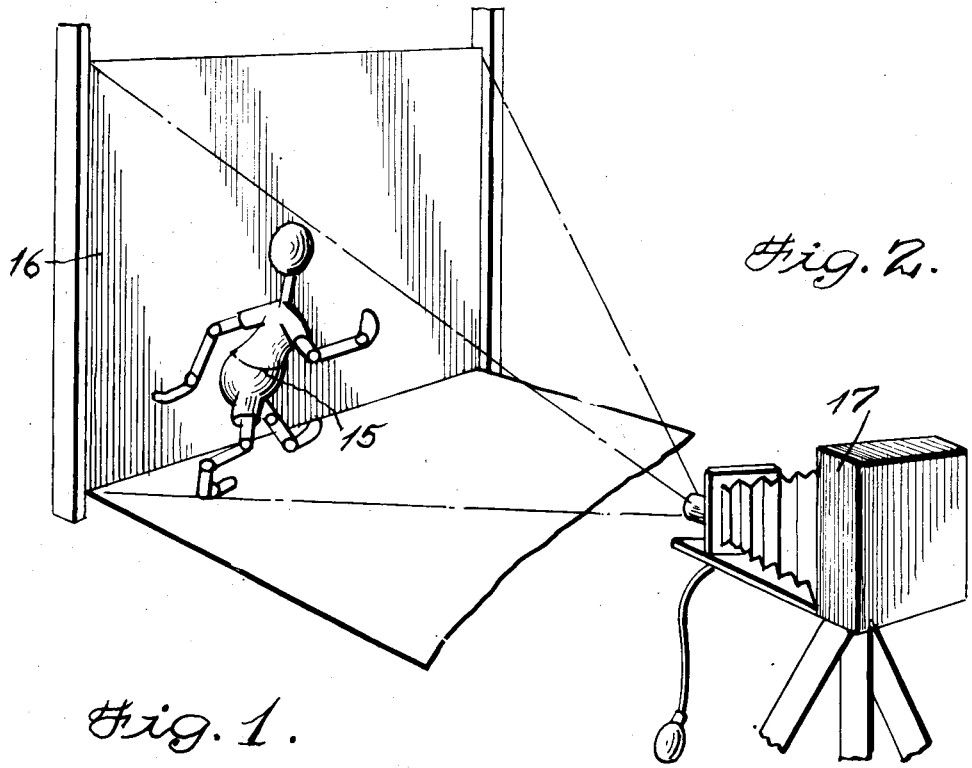

May 13, 1941. A. C. KENDIG, JR 2,241,929
PRODUCTION OF MOTION PICTURES OF THREE-DIMENSIONAL ANIMATED OBJECTS
Filed March 23, 1939 4 Sheets-Sheet 1

Inventor

Albert C. Kendig, Jr.

May 13, 1941.  A. C. KENDIG, JR  2,241,929

PRODUCTION OF MOTION PICTURES OF THREE-DIMENSIONAL ANIMATED OBJECTS

Filed March 23, 1939  4 Sheets-Sheet 2

Inventor
Albert C. Kendig, Jr.
By
Attorney

May 13, 1941.　　　A. C. KENDIG, JR　　　2,241,929
PRODUCTION OF MOTION PICTURES OF THREE-DIMENSIONAL ANIMATED OBJECTS
Filed March 23, 1939　　4 Sheets-Sheet 3
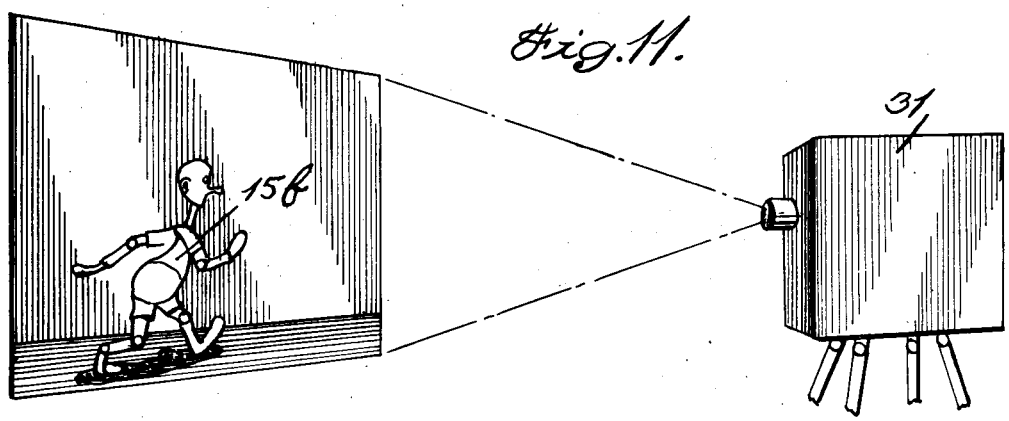
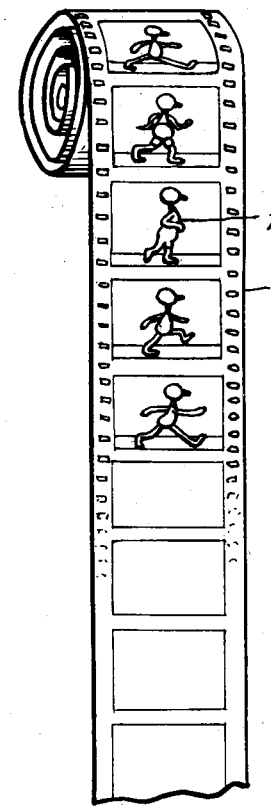
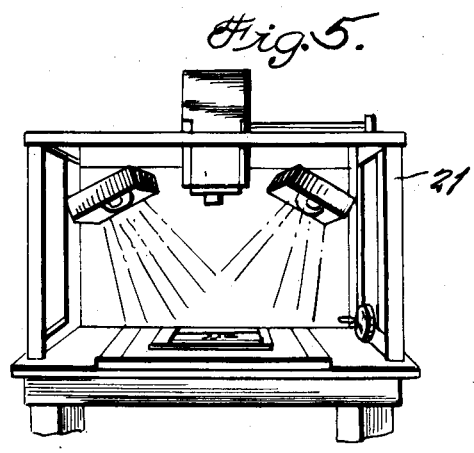
Inventor
Albert C. Kendig, Jr.
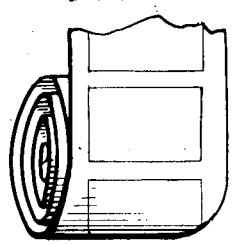
Attorney.

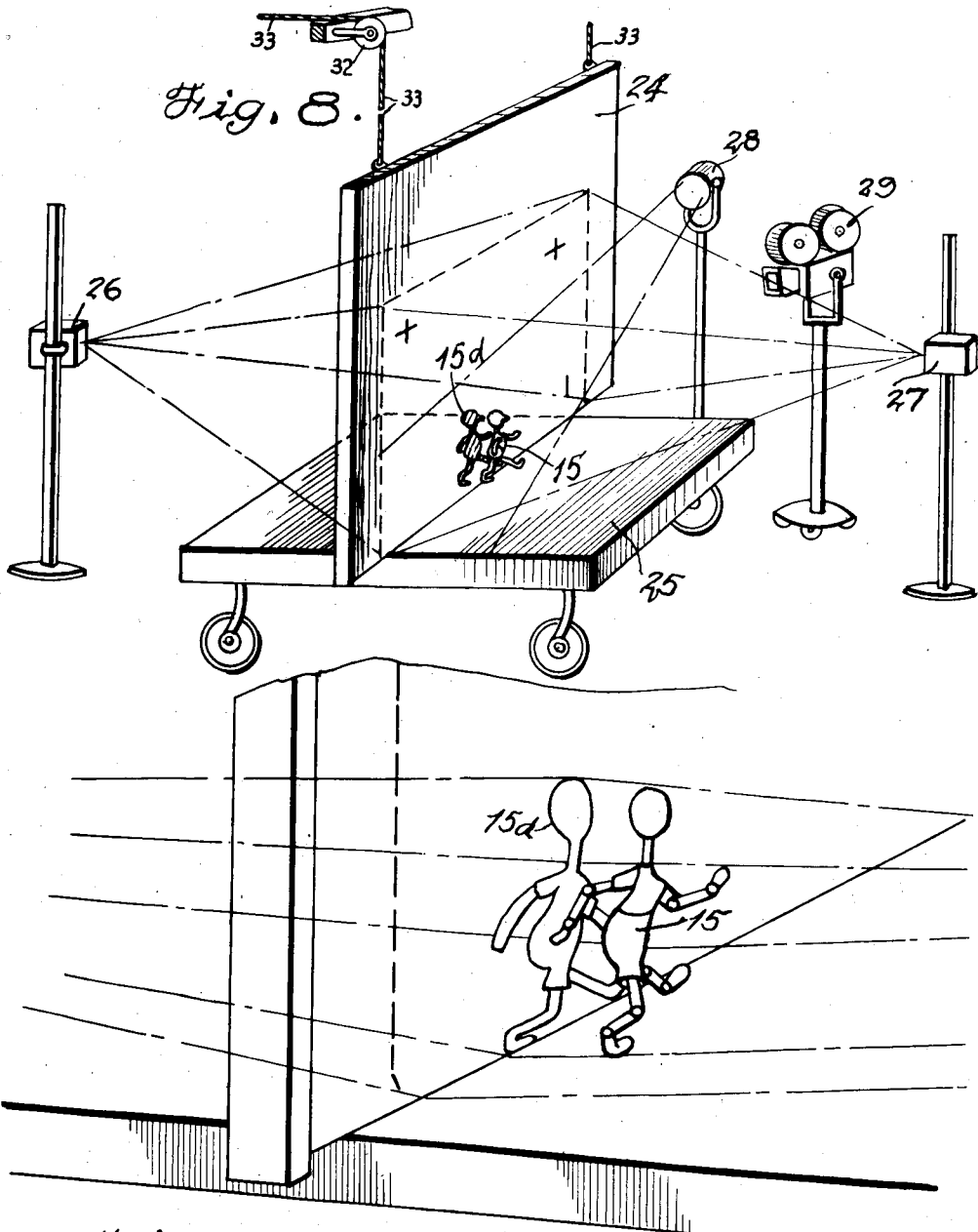

Patented May 13, 1941

2,241,929

UNITED STATES PATENT OFFICE 2,241,929

PRODUCTION OF MOTION PICTURES OF THREE - DIMENSIONAL ANIMATED OBJECTS

Albert C. Kendig, Jr., Los Angeles, Calif., assignor of one-third to Fred W. Clampett, Los Angeles, Calif., and one-third to Robert E. Clampett, Manhattan Beach, Calif.

Application March 23, 1939, Serial No. 263,762

13 Claims. (Cl. 88—16)

This invention relates to the production of motion pictures of three-dimensional animated objects, and it has for its primary object the provision of an improved method of making that type of film known as the animated object motion pictures.

The method disclosed herein possesses many advantages, particularly in the ease, rapidity, and accuracy with which the three-dimensional objects are posed for the production of the animated films that may be either in color or black and white projection, resulting in a smooth life quality of the animation which is accomplished and made visible on a screen when viewing motion pictures produced by the new method.

An object of the invention resides in the provision of a novel method for the production of animated pictures, comprising photographing an object to be animated, such as a doll, a human being, or other animatable object; following the photograph in the making of pencil or other sketches or drawings representing the object in various sequential positions; producing a film strip by photography from a series of the sketches; sequentially projecting the film strip photographs onto a screen; sequentially posing the object or doll in conformity with the projected image on the screen; and sequentially photographing the doll or object in its posed positions for the production of a finished film for projection purposes.

With the above and other objects in view that will become apparent as the nature of the invention is better understood, the same consists in general of certain novel details of construction and combination of parts hereinafter more fully described, illustrated in the accompanying drawings, and specifically claimed.

Figure 1:
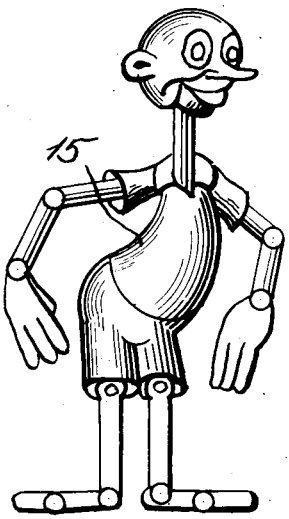
Figure 3:
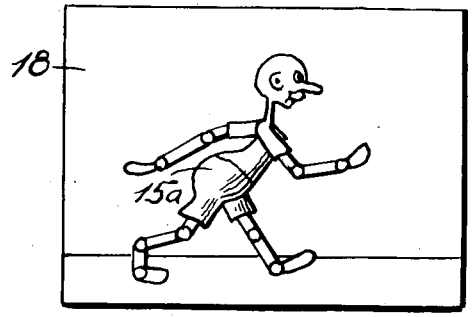
Figure 4:
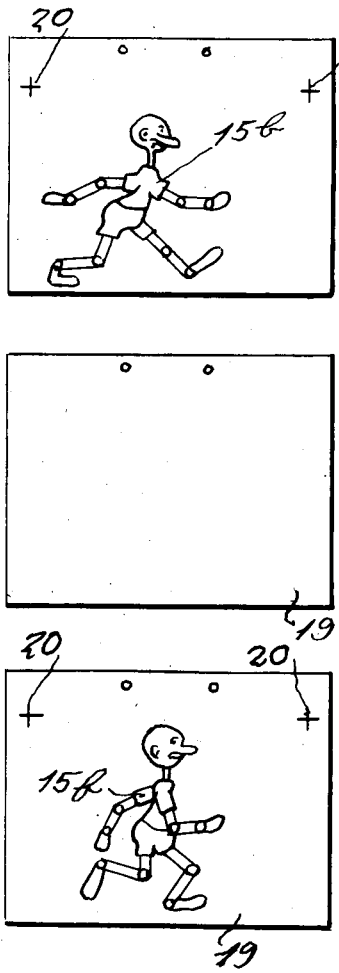
Figure 6:
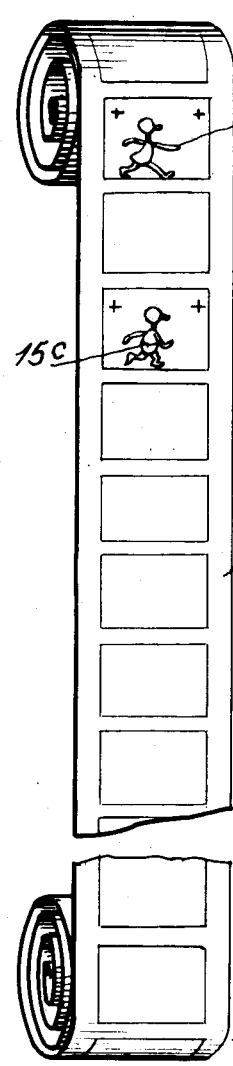
Figure 7:
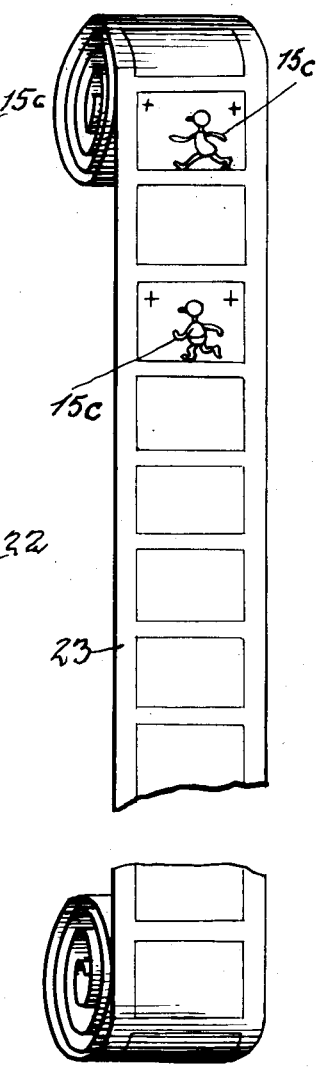

In the drawings:

Figure 1 is a pictorial representation of a doll or other object to form the character of the three-dimensional animated object motion picture, Figure 2 is a schematic view showing the photographing of the doll or object for the production of a photograph to follow in the making of pencil sketches, Figure 3 is a plan view of the photograph of the doll or object, Figure 4 shows a series of animated drawing sheets with an intermediate blank, Figure 5 is a schematic view of a stop motion picture camera for producing film strips from the animated drawing sheets shown in Figure 4, Figures 6 and 7 show film strips produced by the stop motion camera of Figure 5 with the animated doll or object respectively reversely positioned thereon, Figure 8 is a diagrammatic perspective view showing stop motion projectors arranged at opposite sides of the screen for projecting like images onto the screen in superposed relation and a doll or object registered with the projected image, object illuminating means and a stop motion picture camera, Figure 9 is a perspective schematic view, similar to Figure 8, showing the doll projected on the screen and the physical doll posing to correspond with the projected image, Figure 10 is a view of a completed film ready for projection, and Figure 11 pictorially illustrates a moving picture projector and the projected image of the three-dimensional animated object.

The method disclosed herein as practiced in the production of motion picture films of the three-dimensional animated object type will be described in connection with the apparatus disclosed for practicing the method. The invention relates to three-dimensional animated object motion pictures, such as animated cartoons. The object for purposes of illustration in Figure 1 will be described as a doll designated by the reference character 15 that has neck, body, arm, and leg joints so that the doll 15 may be manipulated to cause the same to assume different poses, such as sequences of poses assumed when walking. It is to be understood that a human being could be substituted for the doll, and where reference is hereinafter made to a doll or object, it is also intended to cover a human being.

The doll 15 is first set up, as shown in Figure 2, in front of a screen 16 or other background and a picture thereof taken with the camera 17 for the production of the photograph 18 shown in Figure 3.

The photograph 18 carrying a picture 15ᵃ of the doll is followed in the preparation of a series of pencil sketches or drawings and enables the artist to make such sketches in proper proportion to the actual doll 15, the series of sketches, for instance, being in sequence for illustrating walking movements of the doll 15. The drawing sheets, preferably in the form of rectangles indicated by the reference character 19 in Figure 4, have the pencil doll characters 15ᵇ thereon, the intermediate drawing sheet being illustrated as a blank, the sheets being provided with the usual register marks 20. As stated, Figure 4 represents the pencil sketches or drawings of the animated doll in different positions.

With the aid of the stop motion picture camera 21 shown in Figure 5, the pencil drawings 19 are transferred to the film strips 22 and 23 shown in Figures 6 and 7, respectively, the doll 15c on the two film strips 22 and 23 being respectively reversed as to walking directions.

The next step of the method is practiced with the apparatus illustrated in Figure 8 wherein an opaque or translucent screen 24 rises from a platform or stage 25 and is vertically shiftable relative to such stage by means of pulleys 32 and ropes 33 attached to the screen 24. When a translucent screen 24 is employed, stop motion projectors 26 and 27 are respectively shiftably mounted at opposite sides of the screen 24 and on the same side of the screen 24 as the stop motion projector 27, there is also adjustably placed screen illuminating means 28 and a stop motion picture camera 29. The film strips 22 and 23 are respectively placed in the stop motion projectors 26 and 27 and with the apparatus of Figure 8 in a dark room and the illuminating means 28 inactive, the stop motion projectors are operated to throw upon the translucent screen 24, duplicate pictures 15c from the film strips 22 and 23 and said projectors 26 and 27 are manipulated and shifted to project the dolls 15c as a single image 15d on opposite sides of the translucent screen 24 with the projections appearing as a single image when viewed from either side of the screen 24.

The doll 15 shown in Figure 1 is placed by the operator on the stage 25 and is manipulated or posed to assume the exact posture of the image 15d and is shifted when necessary toward or away from the translucent screen 24 to intercept the light rays from the stop motion projector 27 so that the shadow cast thereby on the translucent screen 24 exactly registers with the image 15d and so that the demarcations or features within the outline of the image fall directly on the surface of the three-dimensional object so as to fit part to part in every detail.

The method may be practiced without the use of the screen 24, the photograph being projected directly onto the object, and also the screen may be employed with only one of the stop motion projectors 26 or 27. Thus, if an opaque screen is used, the projector 26 is useless and may be dispensed with. The shadow of the doll 15 may then be registered with the image 15d projected by the projector 27 and the features within the outline of the doll are registered with those projected onto the doll by the projector 27. While it is more desirable to use a screen behind the doll 15, it will be evident that since the photograph indicating the desired position of the doll is projected by the projector 27 on' the doll 15 itself, the doll may be moved and distorted until its features and outline register with those which are projected thereon without the use of the screen 24. It is again to be noted that the photographs may be produced from living actors or dolls, or the like.

It will also be understood that when a screen is used the method of posing the objects involves the matching of shadows, such as the matching of the shadow cast by the object with the projection on the screen.

If desired, a light filter, such as a red gelatin sheet or transparent red glass, may be placed over the lens of either projector 26 or 27 from time to time to enable the operator to distinguish between the projected images on the translucent screen and to obtain proper registration thereof. It is also desirable to use the two stop motion projectors 26 and 27 that project the image on opposite sides of the translucent screen 24, because when the operator places a three-dimensional object, such as the doll 15 on the stage 25 to match the outline of the projected image, his own shadow faces that of the object and he becomes confused. The entire projected animation image is viewable on the screen regardless of whether the operator comes in the path of light from either projector 26 or 27. A fragmentary enlargement of the apparatus shown in Figure 8 is illustrated in Figure 9, the physical doll 15 being matched with the projected image 15d by having its shadow exactly registering with the projected image 15d.

After the doll 15 has been correctly posed with respect to the image 15d, the stop motion projectors 26 and 27 are cut off, the translucent screen 24 is raised, the illuminating means 28 is rendered active, and the stop motion picture camera 29 records the posed doll 15 for the production of the finished picture. The doll 15 is sequentially posed to follow the positions of the doll 15c on the film strips 22 and 23 until the entire series has been completed.

The pictures produced by the stop motion picture camera 29 are then employed in the production of the finished film strip 30 with the finished doll poses 15e thereon as shown in Figure 10. In Figure 11 the usual motion picture projector 31 is illustrated as projecting the animated motion picture 15f of the original physical doll 15.

From the above detailed description of the invention, it is believed that the construction and operation thereof will at once be apparent, and while there is herein shown and described the preferred embodiment thereof, it is to be understood that minor changes may be made in the details of constructions, such as will fall within the scope of the invention as claimed.

I claim:

1. The method of producing motion pictures of the character described which includes the steps of: making a series of representations of different phases of action in the movement of an animated object; sequentially projecting said representations to form visible images thereof; sequentially posing an object in positions such that a shadow cast thereby substantially registers with the images, and sequentially photographing said object in said posed positions.

2. The method of producing motion pictures of the character described which includes the steps of: making a series of representations of different phases of action in the movement of an animated object, sequentially projecting said representations to form visible images thereof by means of light from a projector, sequentially posing the object in positions such that its outlines substantially register with the projected images, and sequentially photographing said object in said posed positions.

3. The method of producing motion pictures of the character described which includes the steps of: making a series of representations of different phases of action in the movement of an animated object, sequentially projecting said representations to form visible images thereof by means of light from a projector, interposing an object in the axis of projection of the light beam, sequentially posing the object in positions in which the contour thereof is coincident with the cross-sectional contour of the projected light beam, and sequentially photographing said object in said posed positions.

4. The method of producing motion pictures of the character described which includes the steps of: making a series of representations of different phases of action in the movement of an animated object, sequentially projecting said representations onto an object to form images thereon, sequentially posing the object in positions conforming with said images, and sequentially photographing said object in said posed positions.

5. The method of producing motion pictures of the character described which includes the steps of: making a series of representations of different phases of action in the movement of an animated object; sequentially projecting said representations on a screen to form images thereon; sequentially posing an object so that a shadow cast thereby substantially registers with said images on said screen, and sequentially photographing said object in said posed positions.

6. The method of producing motion pictures of the character described which includes the steps of: making a series of representations of different phases of action in the movement of an animated object, sequentially projecting said representations on a screen by means of light from a projector in such manner as to form images on said screen, interposing an object in the path of said light and sequentially posing the object so that a shadow cast thereby substantially registers with each of said projected images, and sequentially photographing said object in said posed positions.

7. The method of producing motion pictures of the character described which includes the steps of: making a series of representations of different phases of action in the movement of an animated object; sequentially projecting said representations on a translucent screen from one side thereof to form images thereon which are visible from the other side of said scren; sequentially posing an object on the side of the screen opposite the projected image and in positions substantially registering with positions represented by said images, and sequentially photographing said object in said posed positions.

8. The method of producing motion pictures of the character described which includes the steps of: making a first series of representations of different phases of action in the movement of an animated object; and a second series of representations of the object in the same relative positions as in the representations of said first series; sequentially projecting said representations of said first and second series in register on opposite sides of a translucent screen in such manner as to form on said screen a sequence of single images representing the object in different positions; sequentially posing the object at one side of said screen intercepting one projected image and casting a shadow that substantially registers with the image projected on the screen from the other side thereof and sequentially photographing said object in said posed positions.

9. The method of producing motion pictures of the character described which includes the steps of: making a first series of representations of different phases of action in the movement of an animated object and a second series of representations of the object in the same relative positions as in the representations of said first series; sequentially projecting with different colored lights said representations of said first and second series in register on opposite sides of a translucent screen in such manner as to form on said screen a sequence of images representing the object in different positions; sequentially posing the object at one side of said screen intercepting one projected image and casting a shadow that substantially registers with the image projected on the screen from the other side thereof and sequentially photographing said object in said posed positions.

10. The method of producing motion pictures of the character described which includes the steps of: photographing an animated object in a phase of action in the movement thereof, making a series of drawings representing said object in different positions with the drawings proportioned in accordance with the photograph of the object; making photographs of said drawings; sequentially projecting said photographs of said drawings onto said object to form images thereon, sequentially posing said object in positions substantially conforming with the positions represented by said images and sequentially photographing said object in said posed positions.

11. The method of producing motion pictures of the character described which includes the steps of: photographing an animated object in a phase of action in the movement thereof, making a series of drawings representing the object in different positions with the drawings proportioned in accordance with the photograph of the object; making photographs of said drawings; sequentially projecting said photographs on a screen to form images thereon, sequentially posing the object so that shadows cast thereby substantially register with said images on said screen, and photographing said object in said posed positions.

12. The method of producing motion pictures of the character described which includes the steps of: photographing an animated object in a phase of action in the movement thereof, making a series of drawings representing said object in different positions with the drawings proportioned in accordance with the photograph of the object; making a first series of photographs of said drawings; making a second series of photographs of said drawings; sequentially projecting said first series of photographs onto one side of a translucent screen to form images thereon; sequentially projecting said second series of photographs onto the opposite side of said screen in such manner that the images formed thereby register with said images resulting from projection of said first series of photographs; sequentially posing the object at one side of said screen intercepting one projected image and casting a shadow that substantially registers with the positions represented by the images projected on the other side of the screen, and sequentially photographing said object in said posed positions.

13. The method of producing motion pictures of the character described which includes the steps of: photographing an animated object in a phase of action in the movement thereof, making a series of drawings representing the object in different positions with the drawings proportioned in accordance with the photograph of the object; making on a film strip a first series of photographs of said drawings; making on another film strip a second series of photographs of said drawings, sequentially projecting said first series of photographs onto one side of a translucent screen to form images thereon; sequentially projecting said second series of photographs onto the opposite side of said screen in such manner that the images formed thereby register with said images resulting from projection of said first series of photographs, sequentially posing the object in positions at one side of said screen intercepting one projected image and casting a shadow that substantially registers with the positions represented by said images projected on the screen from the other side thereof, and sequentially photographing said object in said posed positions in the absence of said projected images.

ALBERT C. KENDIG, JR.